March 19, 1963 A. F. BAXTER ET AL 3,082,050
PORTABLE CABINET
Filed Dec. 13, 1960 5 Sheets-Sheet 1
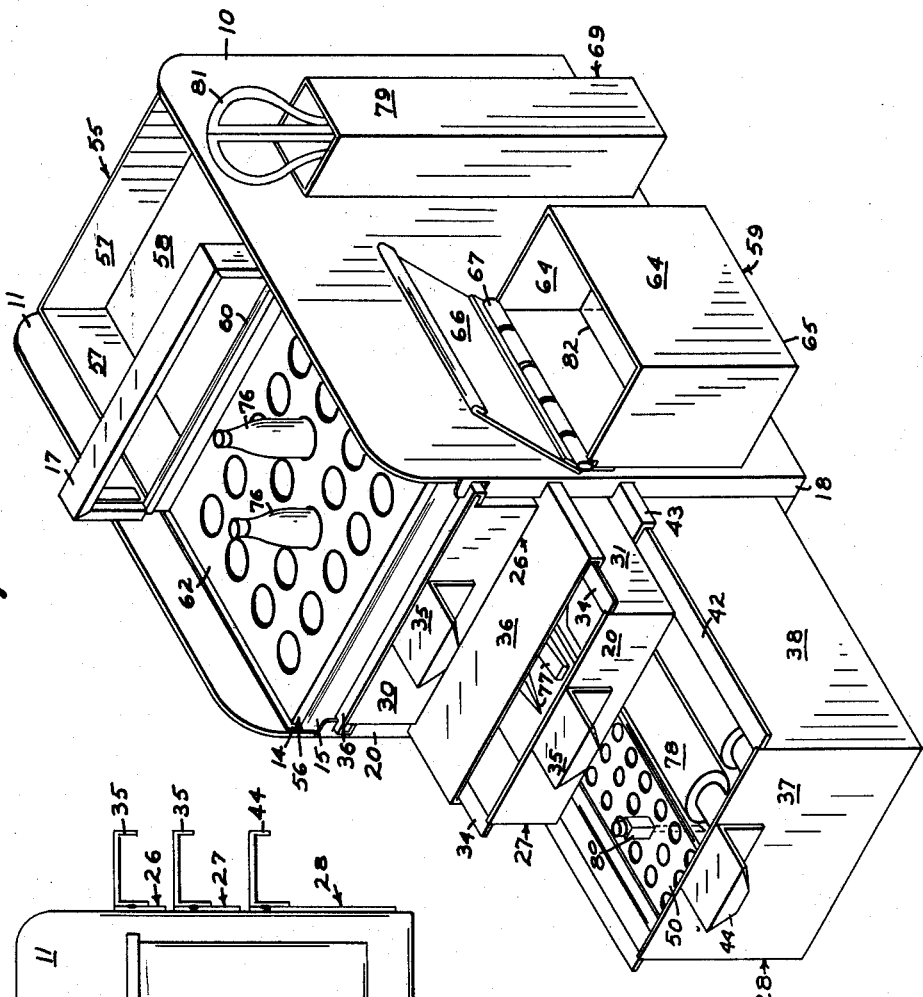
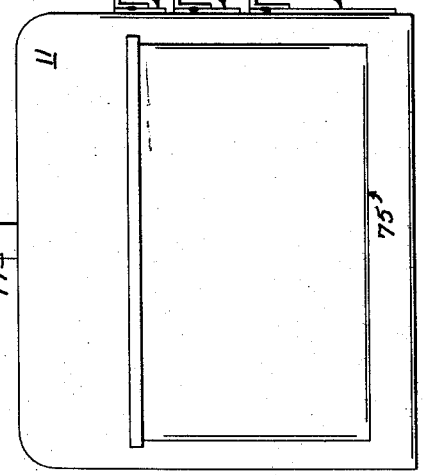
INVENTORS
Arthur F. Baxter
Ernest M. Powers
Helen E. Powers
BY
Attys.

March 19, 1963 A. F. BAXTER ET AL 3,082,050
PORTABLE CABINET
Filed Dec. 13, 1960 5 Sheets-Sheet 2

INVENTORS
Arthur F. Baxter
Ernest M. Powers
Helen E. Powers
BY Wells & St. John
Attys.

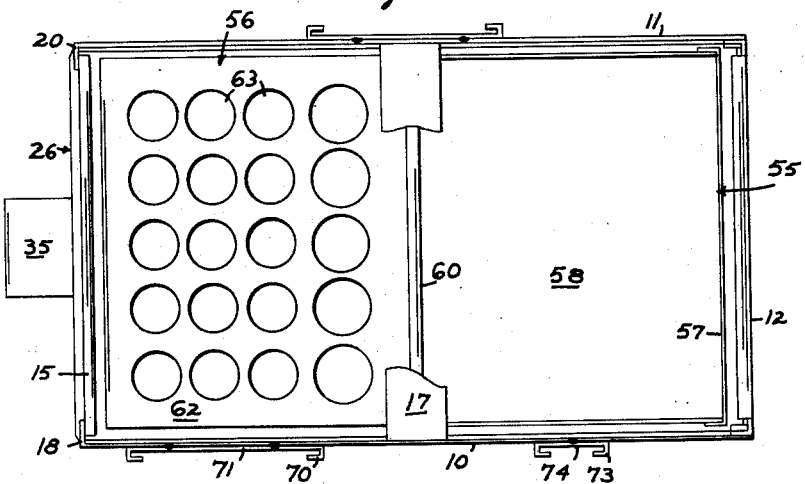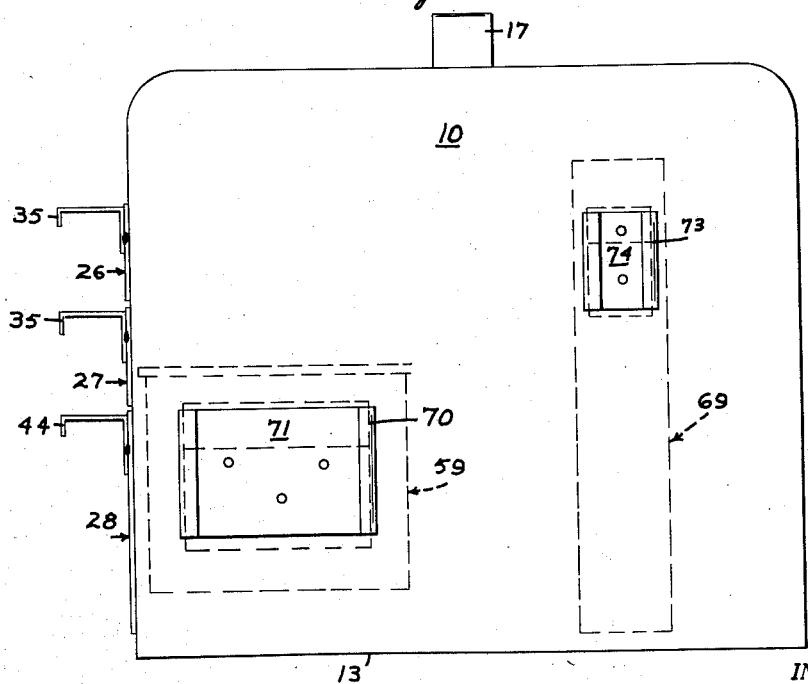

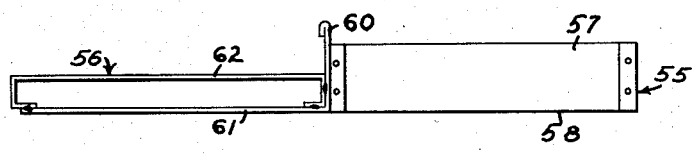
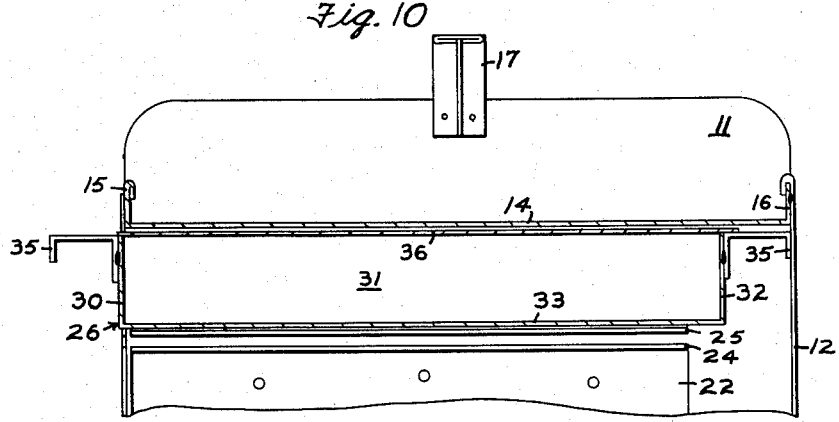
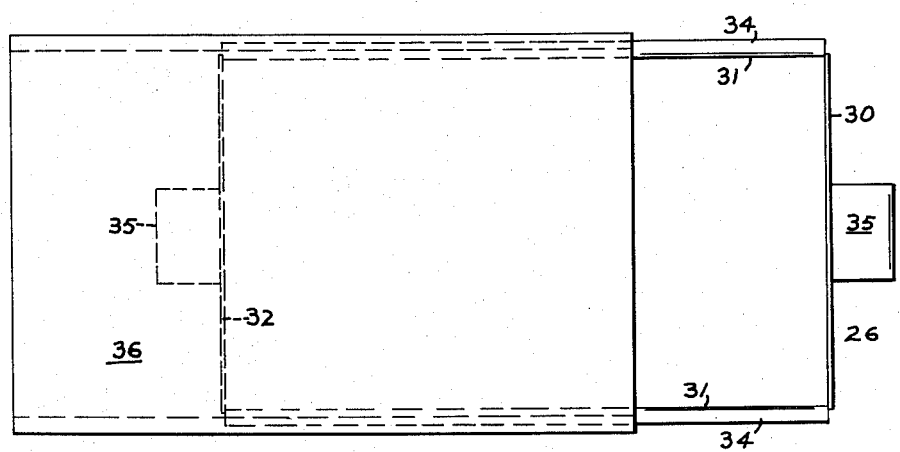
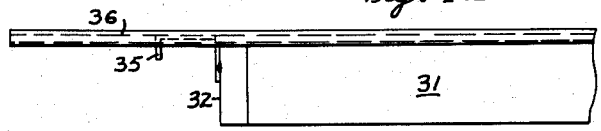

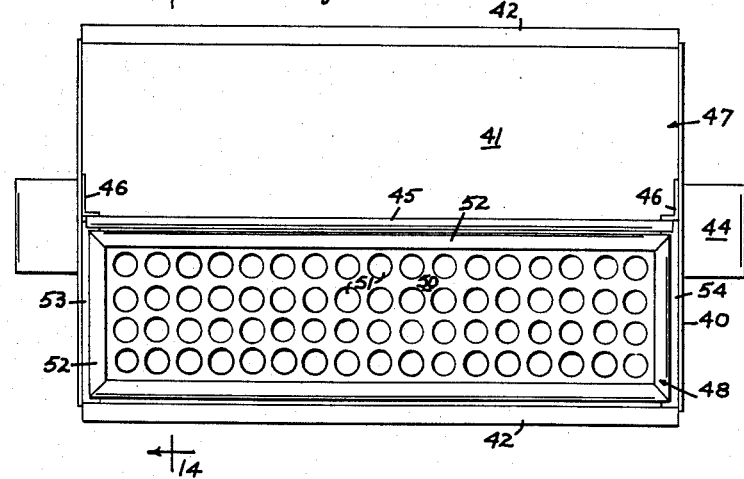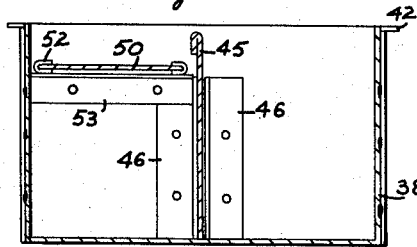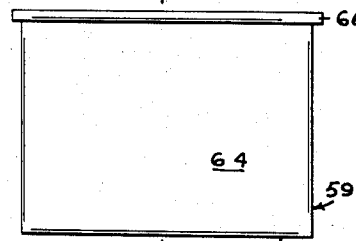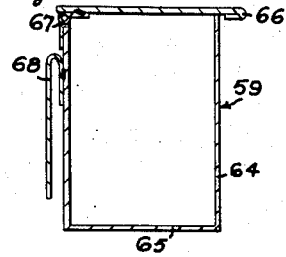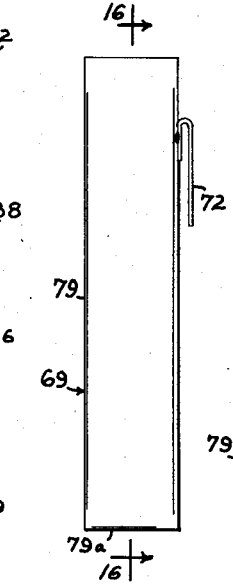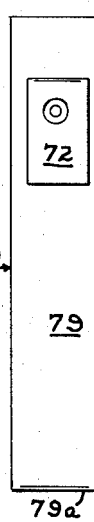

United States Patent Office 3,082,050
Patented Mar. 19, 1963

3,082,050
PORTABLE CABINET
Arthur F. Baxter, Box 83, Challis, Idaho, and Ernest M. Powers and Helen E. Powers, both of 1818 S. Sherman, Spokane, Wash.
Filed Dec. 13, 1960, Ser. No. 75,500
3 Claims. (Cl. 312—209)

This invention relates to a portable cabinet for use in operating and delivery rooms of hospitals. Modern operating procedures require a great number of common instruments such as syringes, needles and medicinal preparations which must be readily available for use by nurses and doctors during operations. Such supplies must be kept sterile and cannot be exposed to the general atmosphere. Today in many hospitals these supplies are sterilized and placed on trays for use when needed. This practice is somewhat objectionable due to the constant maintenance required by the instruments, which must be carefully arranged and protected during operating procedures, and also because of the open nature of the storage facilities. According to the present invention a single cabinet is provided of a suitable size that can be easily managed by one person and which will protect and carry all the necessary implements, such as syringes, that are required in an operating room during an operation.

It is a first object of this invention to provide a unit which can be sterilized in an autoclave using normal procedures and which will retain its sterile condition throughout its projected use. The instant cabinet is highly compact, yet it contains all the useful and functional qualities necessary to guarantee efficient usage during the operation procedures.

It is another object of this invention to provide a portable cabinet which has facilities attached thereto for the reception of used sponges and implements after they have been utilized during an operational procedure. The receptacles in which these used objects are placed are covered in order to insure maximum cleanliness and neatness in the over-all cabinet.

These and further objects will be evident from a study of the attached drawings and the following description of a single preferred embodiment of the invention. It is to be understood at the offset that this embodiment is merely one example of the many practical forms which are contemplated by this invention. For this reason the invention is not intended to be limited except as it is defined in the annexed claims.

In the drawings:

FIGURE 1 is a perspective view of a cabinet made according to this invention;

FIGURE 2 is a side view of the cabinet on a slightly reduced scale looking at the side of the cabinet not shown in FIGURE 1;

FIGURE 7 is a top view of the cabinet shown in FIGURE 1 with the central portion of the handle broken away;

FIGURE 8 is a side view of the cabinet shown in FIGURE 1 with the side receptacles shown in dashed lines;

FIGURE 9 is a side view of the top medicinal tray;

FIGURE 10 is a sectional view taken along line 10—10 in FIGURE 3 with the lower portion of the cabinet broken away and the drawers in place;

FIGURE 11 is a top view of one drawer assembly with the lid partially open;

FIGURE 12 is a side view of the assembly shown in FIGURE 11 with the right hand end of the assembly broken away;

FIGURE 13 is a top view of the deep drawer;

FIGURE 14 is a sectional view taken along line 14—14 in FIGURE 13;

FIGURE 15 is a side view of the instrument receiving receptacle detached from the cabinet;

FIGURE 16 is a sectional view taken along line 16—16 of FIGURE 15;

FIGURE 17 is a rear view of the receptacle shown in FIGURE 15;

FIGURE 18 is a front view of the small liquid carrying receptacle shown in FIGURE 1; and FIGURE 19 is a sectional view taken along the line 19—19 in FIGURE 18.

Figure 3:
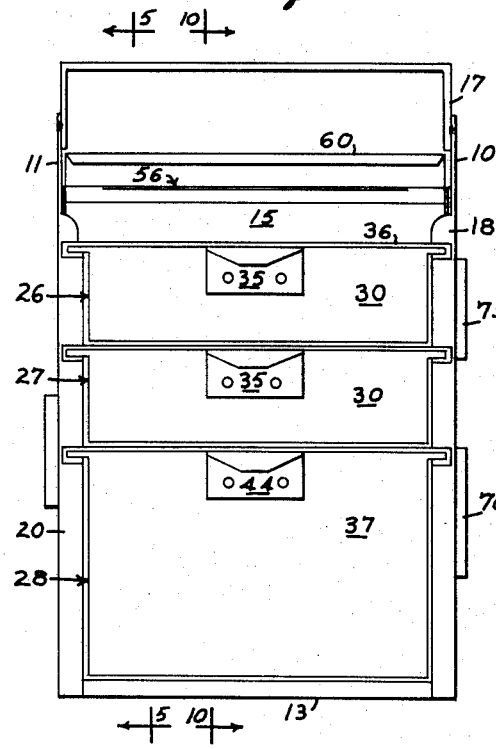
FIGURE 3 is a front plan view of the cabinet shown in FIGURE 1.
Figure 4:
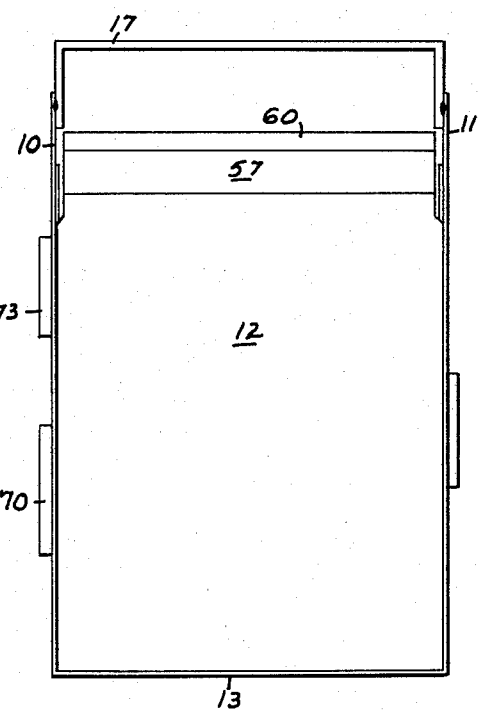
FIGURE 4 is a rear plan view of the cabinet shown in FIGURE 1.
Figure 5:
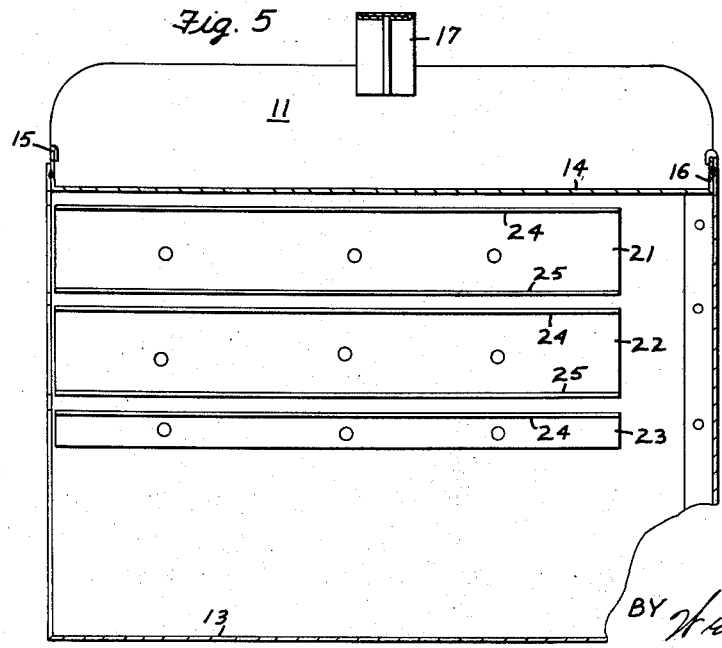
FIGURE 5 is a sectional view taken along line 5—5 in FIGURE 3 with a portion of the side wall and back wall broken away.
Figure 6:
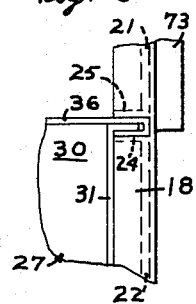
FIGURE 6 is an enlarged fragmentary front view of a single drawer support and corresponding lid showing the drawer and lid construction with relation to the side support.

The primary object of this invention is to provide a compact and efficient portable cabinet for normal nursing and surgical supplies required for nurses in an operating room. This cabinet is shown in use in FIGURE 1. In this figure the over-all cabinet consists of a generally rectangular box formed with two vertical side walls 10 and 11, a rear wall 12 and a bottom wall 13. Also fixedly secured between the side walls 10 and 11 is a top tray 14, having a smooth front edge 15 located in a vertical plane, and a vertical rear edge 16 overlapped by the top edge of the back wall 12. The tray 14 and the bottom wall 13 lie in parallel horizontal planes. This construction provides a stable unit to support the remainder of the cabinet parts. A handle 17 is fixed between the inner surface of the side walls 10 and 11. The handle 17 is provided for manual carrying of the cabinet from one place to another.

All the parts of this cabinet, including those just mentioned, are formed of sheet metal material, preferably stainless steel or any other metal having a high resistance to both heat and corrosion. This sheet metal material must be quite strong in order to withstand normal bumps and falls which might occur during its contemplated usage. The many pieces which are attached to one another are attached by means of spot welding or other suitable procedures which will provide a strong connection between two adjacent elements.

The front edges of side walls 10 and 11 are designated as 18 and 20 respectively. These front edges are bent perpendicularly to the side walls 10 and 11 and form a portion of the front area of the cabinet. The remainder of the front area of the cabinet is open with the exception of the previously mentioned side 15 of the top tray 14. Fixed to the inner surfaces of side walls 10 and 11 are three guide elements 21, 22 and 23. The elements 21 and 22 each include a top flange 24 and a bottom flange 25. The lower element 23 includes only a top flange 24. These flanges 24 and 25 cooperate to form three sliding bearing surfaces for each drawer. The elements 21, 22 and 23 extend across the wall 10 and 11 to the edges 18 and 20 but do not extend entirely to the back wall 12. The flange 24 of the top element 21 is spaced from the lower surface of tray 14 a distance equal to the spacing between the remaining flanges 24 and 25. Thus the drawer guides are formed between the lower surface of tray 14 and the top surface of flange 24 of guide element 21, the lower surface of flange 25 and the top surface of flange 24 of elements 21 and 22 respectively and a lower surface of flange 25 and top surface of flange 24 of elements 22 and 23 respectively.

Mounted within the slidable guides are three drawers generally designated as 26, 27 and 28. The top two drawers, 26 and 27 are identical in the present instant. Each of these drawers consists of a front wall 30, a pair of side walls 31 and a back wall 32. Joining these four walls is a bottom wall 33, having a rectangular configuration. The top edges of the side walls 31 of trays 26 and 27 are bent outwardly in a plane parallel to the bottom wall 33 and are designated at 34. Fixed to the front and rear walls 30 and 32 are identical handles 35 which project longitudinally from the walls 30 and 32 and provide a manual grip for handling the drawers 26 and 27. Each of the drawers 26 and 27 is provided with a lid 36 which completes the individual drawer assembly. The lid 36 consists of a single sheet of metal having rectangular dimensions sufficient to cover the open top areas of the drawers 26 and 27 and the flanged edges 34 of the sides 31. The lateral edges of the lid 36 are bent over the outside edge 34 in overlapping fashion to thereby cover the top and bottom surfaces of the flanged edges 34. Thus the lids 36 are slidable longitudinally with respect to the drawers 26 and 27. This sliding motion of lids 36 is unobstructed since the walls of the drawers and the handles 35 are below the planes of the lid surfaces. Thus the lids 36 can be moved in either longitudinal direction over the drawers 26 and 27. This provides a drawer which may be opened at either end, depending upon the wish of the user. The drawer assemblies are supported within the guides previously described between the flanges 24 and 25 and the lower surface of tray 14. The drawers are not held within the cabinet, but are free to move in a longitudinal direction with respect to the cabinet. It is to be noted that the lid 36 is slidably mounted by the bearing elements 21, 22 and 23 and not the drawer 26 or 27 itself. Thus one desiring to open the drawer 26 or 27 may do so by removing or not removing the lid 36 while pulling the drawer 26 or 27 from the main cabinet. Also each drawer assembly may be sterilized individually in an autoclave and may be inserted into the main cabinet without disturbing the sterile nature of its contents.

The drawer 28 is a deeper drawer than the two previously described drawers 26 and 27. However, it is of the same general over-all construction, including a front wall 37, a pair of side walls 38, a rear wall 40 and a bottom wall 41. The two side walls 38 are flanged outwardly at 42 and slidably support a lid 43 in the manner previously described with respect to lids 36. Also the lid 43 is slidably mounted within the cabinet by flange 25 of element 22 and flange 24 of element 23 in the manner previously described. A pair of handles 44 are attached to the front wall 37 and the rear wall 40 and are identical to the previously described handles 35. The interior of this drawer is somewhat different than the interiors of drawers 26 and 27, which have no partitions according to the preferred embodiment of this invention. Drawer 28 is provided with a central longitudinal partition 45 which has a bent top edge for protection purposes and is slidably supported by a pair of spaced vertical guides 46 fixed to the front wall 37 and to the rear wall 40. The drawer 28 is open on one side of the partition 45 and this area is generally designated at 47. The remaining side of drawer 28 is covered by a recessed plate 48 consisting of a central screen 50 having a plurality of small apertures cut therethrough and designated as 51. The screen 50 is rigidly supported on its edges by a curled rib 52. The rib 52 is supported on two ledges 53 which are fixed respectively to the end walls 37 and 40 of the drawer 28. Thus both the plate 48 and the central partition 45 are removable for cleaning and sterilization purposes.

It is to be noted that the drawers 26, 27 and 28 are slidably mounted in the cabinet so that front walls 30 and 37 of the drawer are substantially flush with the front of the cabinet or the front edges 18 of the side walls 10 and 11. In this position the rear ends of the handles 35 and 44 abut the rear wall 12 of the cabinet. It is immaterial which end of drawers 26, 27 and 28 is inserted first into the cabinet since each end is identical.

At the top of the cabinet is provided a medicinal tray consisting of two portions generally designated as 55 and 56. The portion 55 is simply a rectangular tray and is best seen in FIGURES 7 and 9. It consists of four side walls 57 and a lower floor 58. Attached to the central side wall 57 is an upstanding partition 60 having a curled upper edge for protection purposes. This partition 60 is bent to form a bottom solid floor of the area 56. This floor is designated by the numeral 61. Secured to the partition 60 is an upper plate 62 which is spaced parallel from the floor 61 and which is provided with a plurality of apertures 63. The apertures 63 are made to any desired diameter or configuration as will be described later.

Several liquid containing receptacles are mounted about the outer periphery of the cabinet. As seen in FIGURE 1, the first of these receptacles is a box like structure 59 formed of side walls 64 and a bottom wall 65 which are necessarily welded in liquid tight seal. This receptacle is also shown in FIGURES 18 and 19. Secured to the back wall 64 of the receptacle is a hinged lid 66 which is fastened by a normal hinge 67 to the main body of the receptacle. The back wall 64 of the receptacle has secured to its outer surface a bent bracket 68. The bracket 68 is merely a plain sheet of metal bent in a U-shaped configuration and with its sides lying in vertical planes. This bracket 68 is adapted to co-act with a pair of channels 70 which are formed at the outer edges of a single plate 71 attached to the sides of the wall 10. The two channels 70 slidably receive the side edges of the bracket 68 to detachably mount the receptacle on the wall 10 and prevent movement of the receptacle with respect to the cabinet.

A second liquid containing or receiving receptacle is shown in detail in FIGURES 15, 16 and 17. This receptacle is generally designated by the numeral 69 and is designed with a vertical height far greater than its longitudinal dimensions. It has narrow walls 79 and a bottom wall 79a which are sealed to provide a liquid tight construction. The rear wall 79 has secured thereto a bracket 72 similar in design and usage to the previously described bracket 68. The bracket 72 co-acts with a pair of channels 73 formed on a plate 74 secured to the side 10 in the manner previously described with respect to the plate 71. It is evident that other types of brackets could be substituted to replace those described so long as they provide easily detachable mounting means for the receptacles and prevent rocking movement of the receptacles with respect to the main cabinet structure.

Mounted on the outer surface of the side wall 11 is a third large receptacle generally designated by the numeral 75. This receptacle 75 is identical in construction to the previously described receptacle 59. The only difference between the receptacles 75 and 59 is their size, the receptacle 75 being quite large and covering the major portion of the side wall 11. The receptacle 75 is also mounted on the wall 11 by a bracket and channel as described with respect to the receptacles 59 and 69.

This completes the general detailed description of the cabinet structure, including the drawers and the side receptacles. This cabinet obviously is capable of many uses and can be modified according to the use which will be made of it. However, as shown in FIGURE 1 general provisions are made for a particular use in a surgical or delivery room of the modern hospital. The top medicinal tray has two areas, the first being area 55 and which is capable of holding any boxes or implements which might be desired and a second area 56 having the apertures 63 adapted to hold vials such as shown in FIGURE 1 and designated by the numeral 76, or other bottles or containers. The two shallow drawers 26 and 27 are divided to hold small or medium size syringes or other implements such as those generally shown and designated by the numeral 77 in FIGURE 1. The deeper drawer 28 is designed to hold large syringes such as those designated by the numeral 78 and the plate 48 is designed to vertically support hypodermic needles such as that shown and designated as 80. The needles 80 will be supported in vertical position and will not touch each other. They can be easily removed from the drawer 37 and will be maintained sterile due to the protective covering of lid 43. The receptacles 59, 69 and 75 are designed for waste material. The receptacle 69 is unique in that it is designed to hold pick-ups or other implements such as shown generally in FIGURE 1 and designated by the numeral 81. These implements are used to grab sponges and other dressings during operating procedures. The receptacle 69 would normally be filled with either water or antiseptic fluid as desired. The receptacle 59 would be filled with an antiseptic fluid such as alcohol to a normal level such as shown as 82. This receptacle 59 is designed to hold small sponges and dressings after their removal and usage. Normally the lid 66 will be used to cover the liquid and to protect adjacent articles from contamination. The large receptacle 75 is also designed to hold an antiseptic fluid such as alcohol and is used primarily to hold used syringes and needles which can then be carried in the receptacle 75 for cleaning.

The entire assembly is very compact, yet provides the necessary implements for hypodermic treatment or other surgical procedures in a small volume sealed container and in an efficient manner. Each drawer 26, 27 and 28 can be filled independently and later inserted into the main cabinet. Likewise the receptacles 59, 69 and 75 can be cleaned and filled and then attached to the cabinet. The medicinal tray at the top of the cabinet can be cleaned independently of the cabinet and replaced when desired. The overall cabinet is highly effective and presents a very neat manner of arranging the surgical supplies.

Since the entire structure is made of sheet metal such as stainless steel, any or all of it may be sterilized when desired by use of an autoclave. Each drawer assembly will remain sterile until opened. Thus each drawer assembly could be arranged and sterilized in different departments of the hospital and centrally organized at the operating room.

Obviously many different configurations of drawers and receptacles can be used, depending upon the use required in a particular establishment. The particular embodiment shown in detail is highly effective. However, many other embodiments are equally effective and can be arranged in any manner by varying the sizes of the drawers, the sizes of the apertures and the sizes of the receptacles. In all cases the overall configuration of a rectangular cabinet slidably receiving drawers and slidably mounting the receptacles should be retained. Since many modifications of this cabinet will be readily available to anyone skilled in this art, the above description is not intended to limit the invention. This invention is to be defined only in the following claims.

Having thus described our invention, we claim:

1. A portable cabinet for surgical supplies, fabricated from sheet metal material having a high resistance to heat and corrosion, comprising:
   a rectangular casing including a pair of transversely spaced vertical side walls, the front end of said casing being open;
   a plurality of drawer assemblies mounted within said casing for sliding motion along said walls;
   each drawer assembly comprising a shallow rectangular receptacle having an open top area, the upper edges of the receptacle sides being bent outwardly to thereby form top flanges in a plane perpendicular to the respective sides;
   each drawer assembly further comprising an independently detachable lid consisting of a single flat sheet having an area sufficient to fully cover the open top area of the drawer on which it is mounted, the side edges of each lid being bent back to thereby enable the lid to slidably receive the top flanges of the drawer on which it is mounted;
   inwardly projecting ledges fixed to the side walls of said casing, said ledges being located in vertical pairs on each wall adapted to receive the side edges of a single lid between them to thereby provide a sliding support for said drawer assemblies;
   handle means fixed to each end of each drawer at a location below the plane of its respective lid so as to allow unobstructed motion of the lid relative to the drawer;
   mounting means fixed to the outer side surfaces of said casing;
   a plurality of liquid containing receptacles detachably carried by said mounting means;
   said receptacles comprising a first rectangular basin having a depth considerably greater than its horizontal dimensions adapted to hold manual implements;
   and a second rectangular basin having an overlapping lid hinged thereto adapted to cover the second basin.

2. A portable cabinet for surgical supplies, fabricated from sheet metal material having a high resistance to heat and corrosion, comprising:
   a rectangular casing including a pair of transversely spaced vertical side walls, the front end of said casing being open;
   a plurality of drawer assemblies mounted within said casing for sliding motion along said walls;
   each drawer assembly comprising a shallow rectangular receptacle having an open top area, the upper edges of the receptacle sides being bent outwardly to thereby form top flanges in a plane perpendicular to the respective sides;
   each drawer assembly further comprising an independently detachable lid consisting of a single flat sheet having an area sufficient to fully cover the open top area of the drawer on which it is mounted, the side edges of each lid being bent back to thereby enable the lid to slidably receive the top flanges of the drawer on which it is mounted;
   inwardly projecting ledges fixed to the side walls of said casing, said ledges being located in vertical pairs on each wall adapted to receive the side edges of a single lid between them to thereby provide a sliding support for said drawer assemblies;
   handle means fixed to each end of each drawer at a location below the plane of its respective lid so as to allow unobstructed motion of the lid relative to the drawer;
   one of said drawers comprising a recessed tray removably seated on projections fixed to the inner walls of the drawer;
   said last named tray having a plurality of apertures cut therein adapted to support hypodermic needles in a vertical position with the extended needle portion projecting through one aperture and into the drawer interior.

3. A portable cabinet for surgical supplies, fabricated from sheet metal material having a high resistance to heat and corrosion, comprising:
   a rectangular casing including a pair of transversely spaced vertical side walls, the front end of said casing being open;
   a plurality of drawer assemblies mounted within said casing for sliding motion along said walls;
   each drawer assembly comprising a shallow rectangular receptacle having an open top area, the upper edges of the receptacle sides being bent outwardly to thereby form top flanges in a plane perpendicular to the respective sides;
   each drawer assembly further comprising an independently detachable lid consisting of a single flat sheet having an area sufficient to fully cover the open top area of the drawer on which it is mounted, the side edges of each lid being bent back to thereby enable the lid to slidably receive the top flanges of the drawer on which it is mounted;

inwardly projecting ledges fixed to the side walls of said casing, said ledges being located in vertical pairs on each wall adapted to receive the side edges of a single lid between them to thereby provide a sliding support for said drawer assemblies;

handle means fixed to each end of each drawer at a location below the plane of its respective lid so as to allow unobstructed motion of the lid relative to the drawer;

a removable tray seated on the top surface of said casing;

said tray having a solid bottom surface and an upper element having vertical apertures cut therethrough adapted to position receptacles and containers resting on said solid bottom surface.

References Cited in the file of this patent

UNITED STATES PATENTS

| | | |
|---|---|---|
| 895,640 | Hullhorst | Aug. 11, 1908 |
| 1,143,443 | Schramm | June 15, 1915 |
| 1,173,506 | Hall | Feb. 29, 1916 |
| 1,720,309 | Wakefield | July 9, 1929 |
| 1,774,313 | Braeutigam | Aug. 26, 1930 |
| 1,889,218 | Reedy | Nov. 29, 1932 |
| 2,027,154 | Derman | Jan. 7, 1936 |
| 2,309,888 | Edelmann | Feb. 2, 1943 |
| 2,539,963 | Moberg | Jan. 30, 1951 |
| 2,811,404 | Brooks | Oct. 29, 1957 |